8608X
No Printed Specification Available
*W. Y. Young.*
*Surveying Compass.*
*Patented Jan. 17, 1835.*
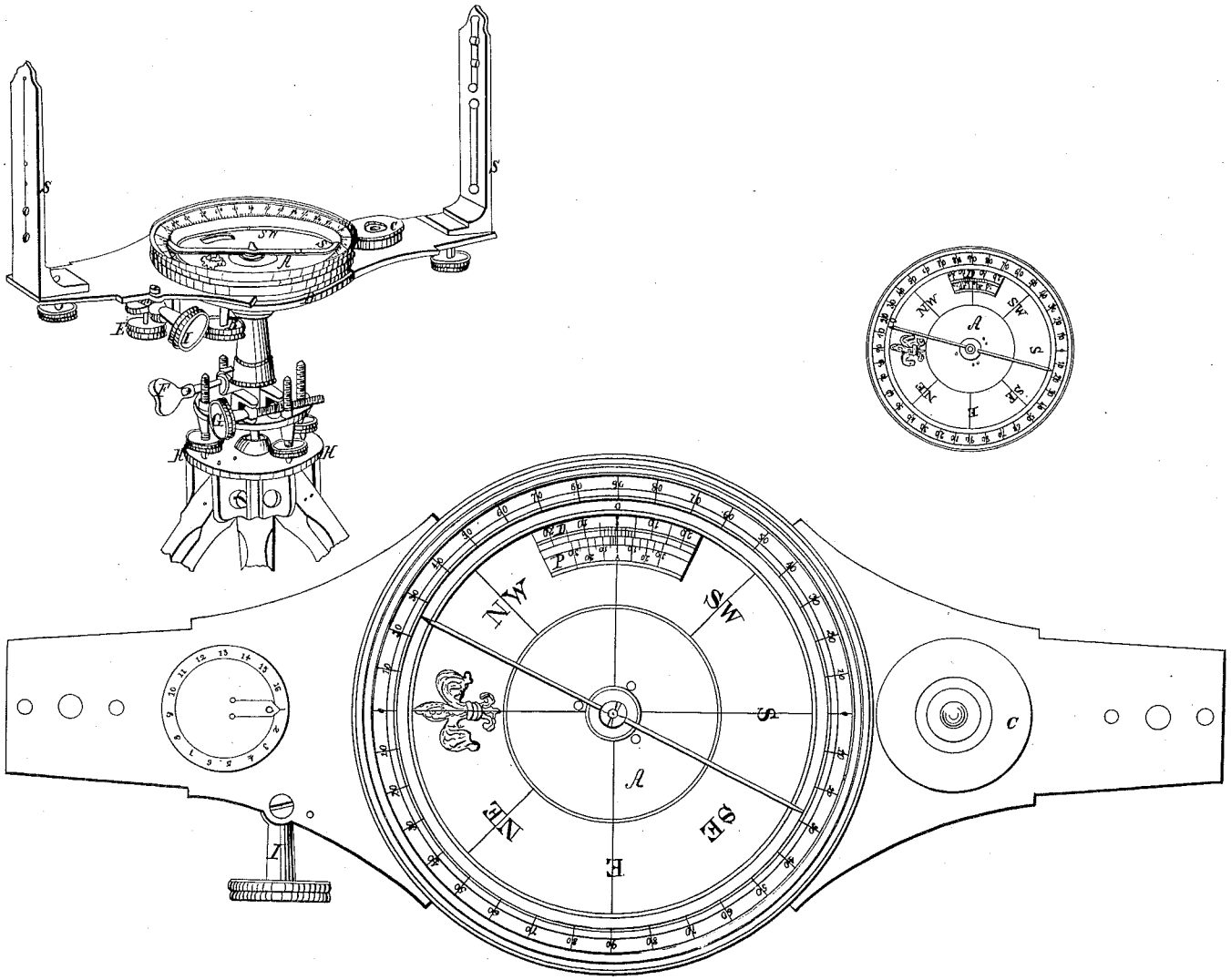

MISSING PAGE TEMPORARY NOTICE

PATENT # 8608X FOR ISSUE DATE January 17, 1835 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Description.